(12) United States Patent
Armstrong et al.

(10) Patent No.: US 7,827,536 B2
(45) Date of Patent: Nov. 2, 2010

(54) CRITICAL PATH PROFILING OF THREADED PROGRAMS

(75) Inventors: Douglas R. Armstrong, Champaign, IL (US); Renee Y. Woo, Los Alamos, NM (US); Zhiqiang Ma, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1584 days.

(21) Appl. No.: 10/975,926

(22) Filed: Oct. 27, 2004

(65) Prior Publication Data

US 2006/0090103 A1 Apr. 27, 2006

(51) Int. Cl.
*G06F 9/44* (2006.01)
(52) U.S. Cl. .................................................... 717/127
(58) Field of Classification Search ................. 370/389; 717/127–133
See application file for complete search history.

(56) References Cited

U.S. PATENT DOCUMENTS

| | | | |
|---|---|---|---|
| 6,728,955 | B1 | 4/2004 | Berry et al. |
| 6,988,264 | B2 | 1/2006 | Sarma et al. |
| 2003/0131168 | A1 | 7/2003 | Kauffman et al. |
| 2005/0081206 | A1 | 4/2005 | Armstrong et al. |

OTHER PUBLICATIONS

Hollingsworth, "Critical Path Profiling of Message Passing and Shared-Memory Programs", 1998, IEEE, vol. 9, No. 10, pp. 1029-1040.*

Hall, "CPPROFJ: Aspect-capable Call Path Profiling of Multi-threaded Java Applications", 2002, IEEE, pp. 1-10.*

"Intel VTune Performance Analyzer 7.1", *Intel Corporation, Retrieved from the Internet:, URL*: http://web.archive.org/web/20040411162501/http://www.intel.com/software/products/vtune/vpa>, (Apr. 2004).

"Intel VTune Performance Analyzer 7.1-Overview", *Intel Corporation, Retrieved from the Internet: <URL*: http://web.archive.org/web/20040411162501/http://www.intel.com/software/products/vtune/VPA/overview>, (Apr. 2004).

"Intel VTune Performance Analyzer 7.1-Product Features", *Intel Corporation, Retrieved from the Internet: <URL*: http://web.archive.org/web/20040411162501/http://www.intel.com/software/products/vtune/VPA/features, (Apr. 2004).

Armstrong, et al., "Methods and Apparatus for Profiling Threaded Programs", U.S. Appl. No. 10/684,662, (Oct. 14, 2003),.

Broberg, et al., "Performance Optimization Using Critical Path Analysis in Multithreaded Programs on Multiprocessors", *Psilander Grafiska, Kariskrona, Sweden*, (1999).

Intel, "Hyper-Threading Technology", *Intel Technology Journal, vol. 6, Issue 1*, (Feb. 2002).

Tune, et al., "Dynamic Prediction of Critical Path Instructions", *Proceedings of the 7th International Symposium on High Performance Computer Architecture*, (Jan. 2001).

* cited by examiner

*Primary Examiner*—Ted T Vo
(74) *Attorney, Agent, or Firm*—Blakely, Sokoloff, Taylor & Zafman LLP

(57) ABSTRACT

A method and apparatus for critical path profiling of threaded programs that use messaging. An embodiment of a method includes creating a package slip for a message from a first program thread, the package slip containing information regarding the message, placing the package slip on a queue, the package slip being accessible to a second program thread, and sending the message from the first program thread.

17 Claims, 8 Drawing Sheets

CRITICAL PATH PROFILING OF THREADED PROGRAMS

FIELD

An embodiment of the invention relates to system performance analysis in general, and more specifically to critical path profiling of threaded programs.

BACKGROUND

Programs, including multi-threaded programs, may be subjected to analysis to determine operational characteristics and inefficiencies. The analysis may include profiling that tracks the critical path for the program.

In a multithreaded program, program threads commonly need to exchange data with one another or synchronize with one another so that the threads can, for example, read or write a shared data without corrupting it. There are numerous ways this can be done, including passing messages to one another.

However, the exchange of data through passing of messages between threads may change the critical path of the program. In one example, in the passing of a synchronous message from a first thread to a second thread, the first thread is required to wait until the second thread has completed processing or has returned an explicit reply, and then proceed with further processing. The message between threads may act as a signal that changes the critical path, and thus is a factor to be tracked in the profiling of the application.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
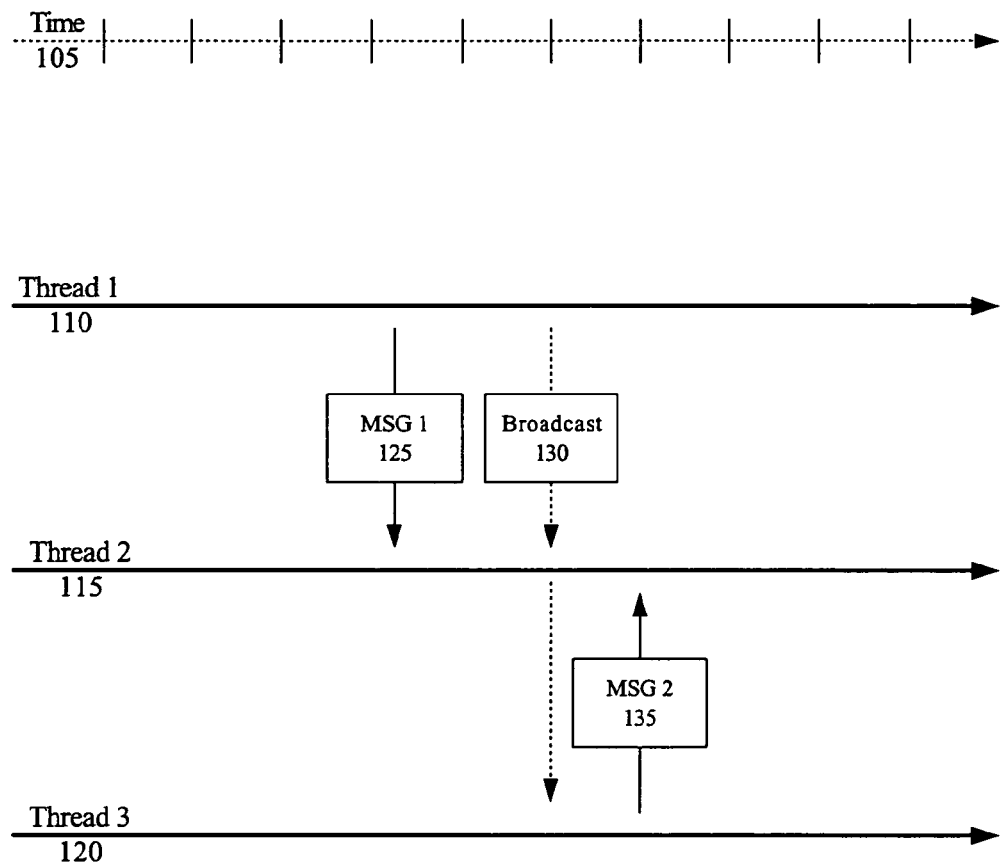
FIG. 1 is an illustration of an embodiment of profiling of a multi-threaded program.

A method and apparatus are described for critical path profiling of threaded programs.

For the purposes of this description:

"Critical path" means the continuous flow of execution of a program beginning to end. The critical path may exclude time waiting for events that are external to the program. The critical path may be abbreviated as "cpath" in this description.

"Profiler" means a mechanism for identifying performance issues for a computer program. The operation of a profiler may include calculation of the impact of synchronization actions on execution time of a threaded program.

"Message signal" means a message that wakes up a program thread that was waiting.

"Synchronization object" means a program object that can be used to coordinate the execution of multiple program threads.

"Package slip" means a program object or other data to contain information associated with a message. The information in a package slip may include information regarding the sending thread for the message, message identification data, and associated parameters. In addition to other possibilities, a package slip may include information about a reply to a message, such that a thread that sent an original message can find information regarding the reply message that is sent by a thread that received the original message.

According to an embodiment of the invention, profiling of the critical path for a program is provided. In one embodiment, transitions between program threads are tracked to determine the critical path. In one embodiment, tracking is provided for message passing between threads.

In an embodiment of the invention, the critical path for a program is tracked by maintaining a set of online data structures, including a tree of possible critical paths, as the program runs. At any point during the run of an application, each node in the tree (which may be referred to as a "leaf" of the tree) represents a thread or a "pending" critical path node. For each thread at any instance the tree has a "current critical path node", which is a leaf node in the tree that represents the current state of the thread. Each active leaf node that is associated with a thread is possibly on the critical path through the application. Nodes are added to and deleted from the tree of possible critical paths as a result of cross-thread synchronization events, with only cross-thread events altering the critical path possibility tree. In an embodiment of the invention, tracked cross-threaded events include messages between threads, which may act as message signals to wake up receiving threads that are waiting.

Under an embodiment, a method is provided for tracking the development of a program's critical path possibility tree as threads interacts with each other using messages. Under an embodiment of the invention, a queue structure is provided for each thread receiving a message. In one embodiment, a queue structure is also provided for broadcast messages. Under an embodiment of the invention, a sending thread can store certain data in the queue structure and a receiving thread can retrieve the data from the queue structure. An embodiment of the invention may be implemented in a thread profiler. An embodiment allows a thread profiler to track critical path transitions through the passing of messages between threads. Message passing is a commonly used communication and synchronization method in Windows programming and tracking this process is needed for accurate analysis of many Window applications.

An embodiment of the invention may be used by a tool to generate a critical path for a program that utilizes message passing. The embodiment allows the critical path execution flows to transition with the transfer of messages, and attributes specific regions of time along the critical path and associates them with particular messages. An embodiment of the invention may calculate a quantitative impact for each message transition and thus can point a user to focus areas for threading or serial optimizations.

Under an embodiment of the invention, a profiler is able to determine whether a thread is being blocked in the waiting of a message. Under an embodiment, monitoring may be limited to message sends that are potentially of interest to the critical path development of the program. An embodiment of the invention is not limited to Microsoft Windows messaging models, but is adaptable to other messaging models as well.

Under an embodiment, two particular cases may be addressed in profiling of a program:

(1) When an attempt to acquire a synchronization object by a thread results in a wait because another thread holds the object, the leaf node representing the thread that waits goes into a "dormant" state. If a message signal arrives from another thread, it then may be determined that the receiving thread was not on the critical path while waiting. If the thread subsequently continues running but this is not attributed to the release of a synchronization object from another thread, then the "dormant" node of the thread becomes active again and the thread may be a candidate for the critical path.

(2) When a thread releases a synchronization object that another thread is waiting for, the releasing thread will issue a "pending node". As the waiting thread starts up again, its current "dormant node" would be discarded and the pending node is added to the tree to represent the possible critical path through the newly active thread. The pending node would then become the current critical path node for the thread.

In an embodiment of the invention, messages that are the subject of profiling may include synchronous and asynchronous messages. In synchronous message passing, after a thread sends a message, the sending thread is blocked from further execution until a receiving thread has processed the message, or, in certain systems, until the receiving thread has sent a reply explicitly. In order to process a message sent synchronously to a thread, the sending thread typically puts itself in one of several waiting states via system API (application program interface) calls. When such a message arrives, the computer system then may ensure that the correct message handler is called in the context of the thread.

For asynchronous message passing, a sender thread may in certain cases expect a response to a message. If a sender thread is expecting a response, the sender thread may perform other work until the response is received. In one particular example, on a Win32 system (Win32 indicating an application programming interface for 32-bit Windows operating systems of Microsoft Corporation), a message sent asynchronously is en-queued to a queue mechanism that is associated with the recipient thread. The sender thread continues its execution after sending the message. The recipient thread examines and retrieves messages in the queue and processes them at its own convenience. In addition, there are methods available to block and wait until a message arrives if the queue is empty. In certain cases, it is also possible to provide an asynchronous message in which the sender provides a callback to indicate that the processing by the receiver is complete.

Multiple message operations may occur simultaneously or in overlapped fashion. In certain operations, it is possible that the sender of a synchronous message, while waiting for the receiving thread to finish, may process a message sent synchronously from a third thread. At a given time, it is possible for a thread to be processing multiple messages sent synchronously to it from various different threads. For example, a thread while handling a message synchronously sent to it from a first thread may send a synchronous message to a second thread. While waiting to return from the message to the second thread, the thread can process a message sent to it from a third thread. Further, message passing operation is not constrained to a pair of threads. In addition to sending a message from a first thread to a second thread, broadcast messages may also be sent to multiple threads or to a group of threads synchronously or asynchronously. An embodiment of the invention is able to handle synchronous messages simultaneously processed by a thread. An embodiment of the invention is not limited to point-to-point messaging, but may also be implemented with regard to broadcast messages to multiple threads.

When a thread is waiting for a message to arrive, the thread is essentially prevented from doing further work, and therefore execution flow for the thread is generally no longer on the critical path. The thread may, in certain circumstances, again be on the critical path when a wait for the thread times out. When a message arrives for a thread that is waiting, the recipient thread can resume running, whether it is waking up from a waiting API or having some kind of handler procedure called by the system in its context. For this reason, the sending of a message is a "message signal" from the sending thread that may possibly make a critical path transition from the sending thread to the receiving thread. Further, when a thread that is sending a message synchronously is waiting for a reply, it is blocked from doing further work. Thus when the recipient finishes the processing of the message, or provides an explicit reply, this also may serve as a "message signal".

Under an embodiment of the invention, a process or apparatus is provided to handle the possibilities in messaging systems and to journal the impact of the possibilities on critical path development. An embodiment of the invention may operate by performing processing at the following points in a program:

(1) Before and after a thread sends a synchronous or asynchronous message to another thread;

(2) After a thread wakes up from waiting at the message queue for an asynchronously sent messages;

(3) Before a thread starts processing a message sent to it synchronously;

(4) After a thread is finished processing a message sent to it synchronously; or (5) Before and after a thread sends an explicit reply to a synchronous message.

In an embodiment of the invention, the transfer of messages is modified to facilitate tracking by a profiler. In a particular example of a Microsoft Windows operation, a profiler may operate by registering Windows message hooks and intercepting calls to Windows messaging APIs via instrumentation. However, other embodiments of the invention are not limited to these processes and may utilize other procedures.

In an embodiment, to register the appropriate critical path change as threads send, receive, and process messages, extra information is packed from the message sender, with such information being accessible to the receiving thread or threads. In one embodiment, a user's API call is modified to cause a wrapped message to be sent instead of the original message. In one embodiment of the invention, added information for a message may include:

(1) Information regarding the original message (in one example, messageID, wParam, and iParam for Windows), which may be provided as a copy of the original message;

(2) A pointer to a node (or "signal leaf"), which encapsulates the "signaling" of the sender thread and may be useful for joining up critical paths from sender to recipient when appropriate;

(3) For the case of a synchronous message, a slot for entering a pointer to a "reply leaf" node, which encapsulates the "signaling" of the recipient to the sender;

(4) A flag to facilitate safe destroying of a package slip by whichever thread is last to access the package slip.

In one embodiment of the invention, modification of a message is used for tracking message passing for asynchronous messages, such as by wrapping the message with data concerning the message. However, in certain circumstances it may not be possible to replace a user's original call with a wrapped message without generating certain problems. For example, Windows may create certain complications with regard to synchronous messaging. For example, a hook may not be able to unwrap and restore a user message before handing it off to the handler, but instead the receiving hook may form a new message that is similar to the original and send the new message to itself. Because of this, a message reply mechanism would not be associated with the original message. In addition, a message wrapping approach may require more care with manipulation of Windows hooks. Program behavior might be undesirably altered because wrapped messages may in certain circumstances reach user code.

Under an embodiment of the invention, tracking of messages is facilitated using certain data structures. The data structures may include one or more queues or memory stacks. In an embodiment, a set of data structures is associated with each thread that receives a message. When another thread tries to send a message to a given thread, a "packaging slip" is en-queued for the message in the recipient thread's queue. When the receiving thread receives the message, the receiving thread attempts to match the message with the packaging slip in the queue structures to obtain information about the message. Due to certain factors such as possible context switches, even though the packaging slip of thread-1 to thread-0 is en-queued earlier than that from thread-2 to thread-0, thread-0 might process the message from thread-2 first. Under an embodiment of the invention, an attempt to properly match up messages and packaging slips is made based on message identifiers and parameters.

The appropriate handling of the sending and receiving of synchronous messages may be more involved than other messages because the end of processing of the recipient or an explicit reply by the recipient is a message signal to the waiting sender thread. In addition a receiving thread may be handling synchronous messages sent from multiple threads at the same time, with the handler functions nesting inside one another.

In one embodiment, each receiving thread of a program has three associated data constructs for maintaining pointers to package-slips:

(1) A queue for use with synchronous messages, which may be referred to as the sync-r-queue (r indicating "receiving");

(2) A stack for use with synchronous messages, which may be referred to as the sync-p-stack (p indicating "processing") to keep track of synchronously-sent messages currently being processed and which is used to maintain state and match replies to synchronously-sent messages; and (3) A queue for use with asynchronous messages, which may be referred to as the async-r-queue.

In one embodiment of the invention, a global set of data structures is also maintained for broadcast messages.

In an embodiment, a queue for asynchronous messages is maintained in addition to wrapping the messages. This process allows for optimizing critical path tree maintenance by marking all of the pending messages in the async-r-queue as uncontended whenever the thread leaves the wait state. This prevents unnecessary critical path tree updates for messages that did not cause a cross thread event.

In an embodiment of a thread profiler, the following cases of asynchronous or synchronous sending or receiving may be addressed as follows:

Synchronized sending—When sending to a different thread within the same process, a pending node and package slip are created and the package slip is en-queued in the sync-r-queue or broadcast-sync-r-queue as appropriate. The process then is placed in a state of waiting and a send API is invoked. When the send API completes, the state is restored to "active". If applicable, the package slip is checked to determine if the receiving thread contains a reply leaf, which will serve as a message signal for the wait, and if so the reply leaf is used as the thread's current cpath node, if appropriate. Time statistics are updated along the thread's current cpath node.

Asynchronously sending—When sending to a thread that is waiting for a message, a pending node and package slip are created and the package slip is en-queued to the async-r-queue or broadcast-async-r-queue, as appropriate. The send API is invoked, but a wrapped message (instead of the original message) is sent, with the wrapper containing a pointer to the associated package slip.

Synchronized receiving—When a message arrives, an attempt is made to find a corresponding package slip for the message starting from the front of the sync-r-queue. If the attempt fails, there is an attempt to find the package slip in the broadcast sync-r-queue. If found, the signal leaf node from the package slip is "claimed" to be the current cpath node of this thread and the time statistics are updated. The package slip or a dummy slip (if a package slip is not available) is pushed onto the receiving thread's processing stack (sync-p-stack) and the thread state is updated to "active". After the message handler has been executed, the item at the top of the stack is popped from the stack. If the package slip does not already contain a reply node (which would be present if the message handler has performed an explicit reply-message API call), then a new pending node is created for the reply signal and placed into the package slip for later processing by the sender thread.

Asynchronously receiving—When a message arrives, an attempt is made to obtain its wrapper, if the message is a wrapped message. An attempt is made to find a matching package slip for this message in the queue (async-r-queue) and the remove all entries from the queue (because they will never serve as message signals to this thread). If a matching slip is not found, the broadcast queue (broadcast-async-r-queue) is also checked. If a matching package-slip is found and the signal leaf in it is claimed, the signal leaf is used as the receiving thread's current cpath node. Time statistics are updated for the thread's current cpath node. The message is unwrapped (if the message was wrapped) to restore the original message to be processed by the user.

FIG. 1 is an illustration of an embodiment of profiling of a multi-threaded program. In this illustration, multiple threads are in operation in a program, the threads being shown as a first thread 110, a second thread 115, and a third thread 120, which are shown in relation to time 105. Under an embodiment of the invention, the first thread 110 sends a first message 125 to the second thread 115 or sends a broadcast message 130 to all threads. The second thread may also receive a second message 135 from the third thread 120 and thus may be handling multiple messages. Each message may be either a synchronous message or an asynchronous message. Under an embodiment of the invention, the critical path of the program is tracked as the messages are transferred. Under an embodiment of the invention, each thread has a set of data structures to maintain tracking information. In one embodiment, a set of data structures for broadcast messages is also provided to maintain tracking in connection with broadcast messages.

Figure 2:
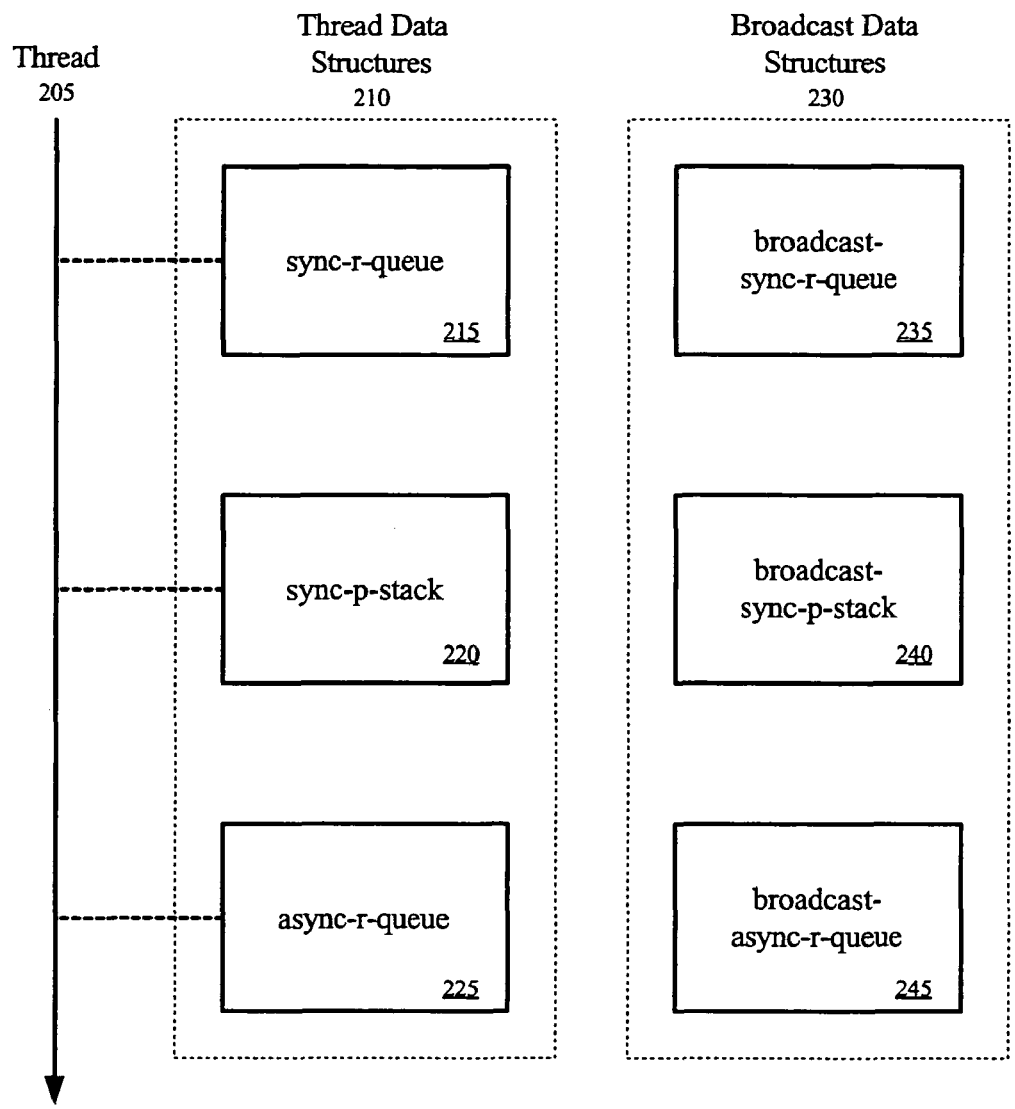
FIG. 2 is an illustration of an embodiment of data structures for profiling message passing in a program.

FIG. 2 is an illustration of an embodiment of data structures for profiling message passing in a program. In one embodiment of the invention, data structures are provided for each thread in a program. For example, a thread 205 has a set of data structures 210 associated with it. In one embodiment, the set of data structures 210 includes three constructs. The constructs are a queue for receipt of synchronous messages (sync-r-queue) 215, a stack for processing of synchronous messages (sync-p-stack) 220, and a queue for receipt of asynchronous messages 225. In an embodiment, the set of data structures 210 is utilized in the tracking of messages to the thread 205. Under one embodiment of the invention, a set of data structures is also provided for broadcast messages 230. Under an embodiment of the invention, the broadcast data structures 230 also include a queue for receipt of synchronous messages (broadcast-sync-r-queue) 235, a stack for processing of synchronous messages (broadcast-sync-p-stack) 240, and a queue for receipt of asynchronous messages 245 (broadcast-async-r-queue). In an embodiment of the invention, the data structures are used in the tracking of the critical path of the program.

Figure 3:
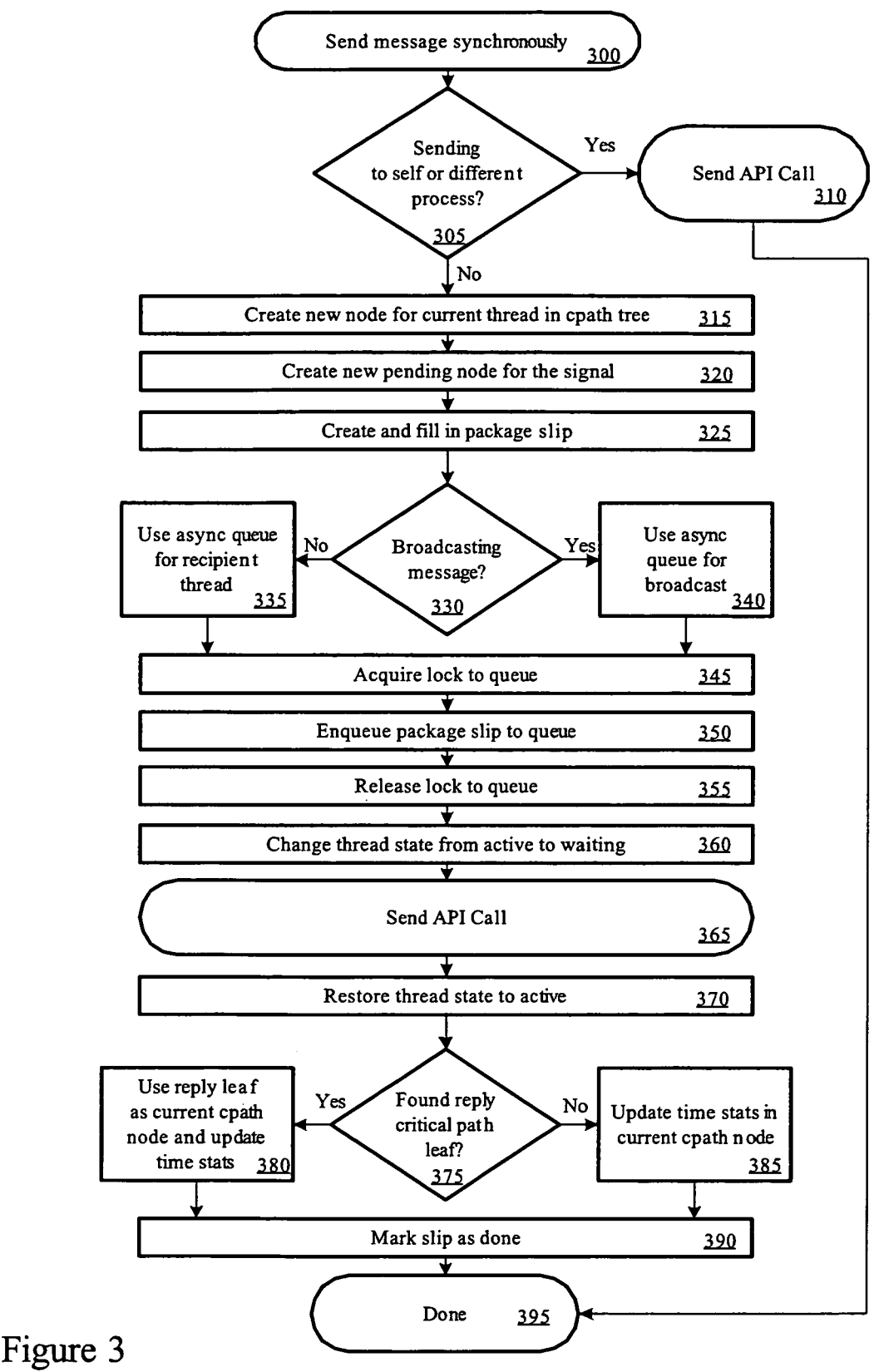
FIG. 3 is an illustration of an embodiment of operations for sending a synchronous message.

FIG. 3 is an illustration of an embodiment of profile operations for sending a synchronous message. In illustration, a message is sent synchronously 300. If the message is sent to the same thread or to a different process, there is an API call for the process 310 and the process is done 395. If not, then the critical path is tracked. A new node (which may be designated as a "signal leaf" or "sig-leaf") is created for the current thread in a current path tree 315. A new pending node is created for the message signal 320. A package slip is created and is filed with information 325, the information including the sig_leaf, the sending thread for the message, the message identification, and associated parameters. If the message is not broadcast 330, and thus is a thread-to-thread message, then a queue for receipt of synchronized messages (sync-r-queue) for the recipient thread is used 335. If the message is broadcast 330, then a queue for receipt of synchronized messages (broadcast-sync-r-queue) for broadcast is used 340.

In this illustration, a lock is acquired for the appropriate queue 345. The package slip is en-queued to the queue 350 and the lock for the queue is released 355. The state of the thread is changed from "active" to "waiting" 360 for purposes of waiting for the reply for the message. An API call for the message is made 365. The state of the thread is returned to active. There is a determination whether a reply critical path leaf ("reply_leaf") is found 375. If so, the reply_leaf is used as the current critical path node for the thread and time statistics are updated in the node 380. If the reply_leaf is not found 375, then the time statistics for the current critical path node are updates. After updating time statistics, the package slip is marked as done 390 and the process is done 395.

Figure 4:
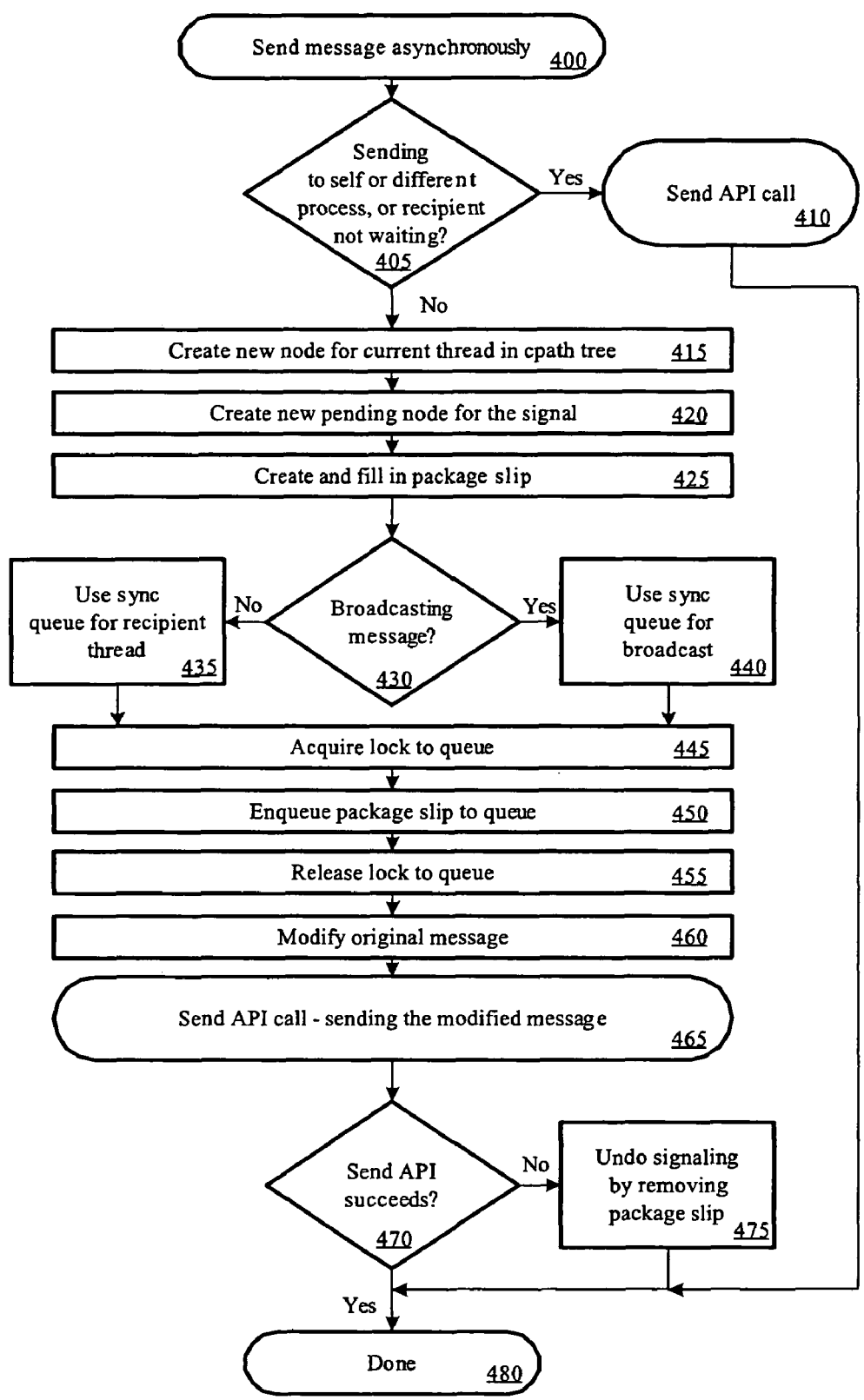
FIG. 4 is an illustration of an embodiment of operations for sending an asynchronous message.

FIG. 4 is an illustration of an embodiment of profile operations for sending an asynchronous message. In illustration, a message is sent asynchronously 400. If the message is sent to the same thread or to a different process or a recipient is not waiting for the message 405, there is an API call for the process 410 and the process is done 480. If not, then the critical path is tracked. A new node is created for the current thread in a current path tree 415. A new pending node ("signal leaf" or "sig-leaf") is created for the message signal 420. A package slip is created and is filled with information 425, the information including the sig_leaf, the sending thread for the message, and the message identification and associated parameters. If the message is not broadcast 430, and thus is a thread-to-thread message, then a queue for receipt of synchronized messages (sync-r-queue) for the recipient thread is used 435. If the message is broadcast 430, then a queue for receipt of synchronized messages (broadcast-sync-r-queue) for broadcast is used 440.

In this illustration, a lock is acquired for the appropriate queue 445. The package slip is en-queued to the queue 450 and the lock for the queue is released 455. The original message is modified 460, with the modification including a key to indicate that the message is wrapped and a pointer to the associated package slip. An API call for sending the message is made 465, with the modified message being sent. If the send API succeeds 470, then the process is done 480. If the send API does not succeed 470, then the signaling is undone by removing the package slip from the appropriate queue 475, and the process is then done 480.

Figure 5:
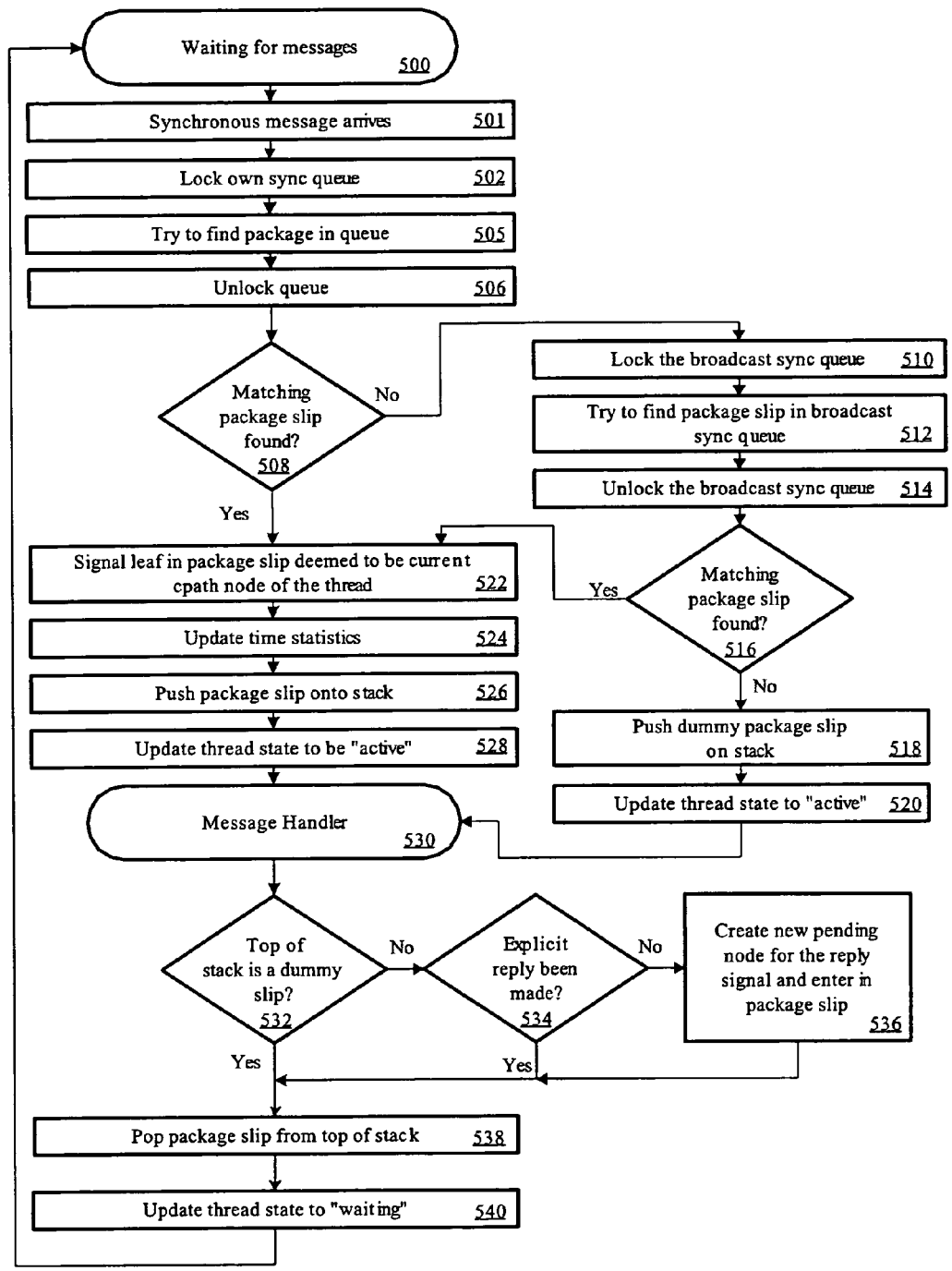
FIG. 5 is an illustration of an embodiment of operations for receipt of a synchronous message.

FIG. 5 is an illustration of an embodiment of profile operations for receipt of a synchronous message. In this illustration, there is initially a wait for messages for a thread 500 and a synchronous message arrives 501. The synchronous queue for the thread is locked 502 and there is an attempt to locate a matching package slip for the message in the queue 504. The queue is unlocked 506 and there is a determination whether the package slip is found 508. If so, then the "signal leaf" node in the package slip is deemed to be the current critical path node of the thread 522. The time statistics for the signal leaf are updated 524 and the package slip is pushed on the synchronous processing stack (sync-p-stack). The thread's state is updated to "active". In this illustration, a message handler is invoked to process the message 530. If the package slip is not found 508, then there is a check for a broadcast message package slip. The broadcast synchronous message queue (broadcast-sync-r-queue) is locked 510, there is an attempt to locate the package slip 512, and the queue is unlocked 514. If the matching package slip is found 516, then the process continues with the signal leaf in the package slip being deemed to be the current critical path node of the thread 522. If the matching package slip is not found 516, then a dummy package slip is pushed on the stack 518, the thread state is updated to "active", and the message handler is invoked 530.

In this illustration, there is determination whether the top of the stack is a dummy slip 532. If so, the package slip is popped from the top of the stack 538, the thread state is updated to "waiting" 540, and the process returns to waiting for messages 500. If the top of the stack is not a dummy slip 532, then there is a determination whether the package indicates that an explicit reply has been made for the message 534. If so, then the process continues with popping the package slip from the top of the stack 538. If not, then a new pending node is created for the reply signal and the pending node is entered in the package slip 536. The process continues with popping the package slip from the top of the stack 538.

Figure 6:
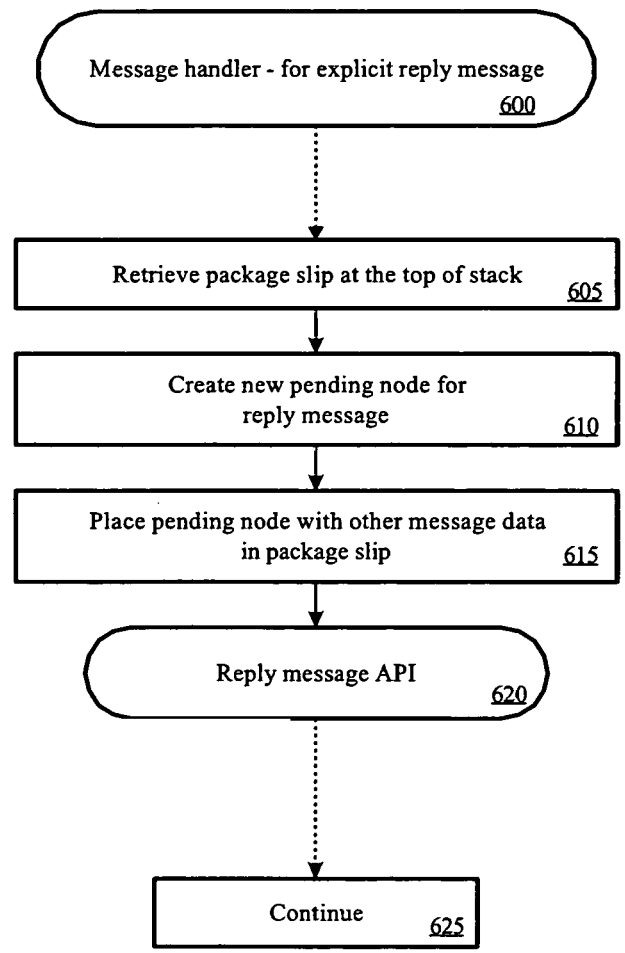
FIG. 6 is an illustration of an embodiment of an operation of a message handler for an explicit reply message.

FIG. 6 is an illustration of an embodiment of an operation of a message handler for an explicit reply message. In this illustration, the operation of the message handler 600 includes retrieving the package slip at the top of the processing stack 605. A new pending node for the explicit reply message is created 610.

The pending node is inserted into the package slip 615 together with information regarding the message, such as the sending thread for the message and the message identification and associated parameters. An API message may then be called for the issuing of the reply message 620. The message handling process then continues 625 as appropriate.

Figure 7:
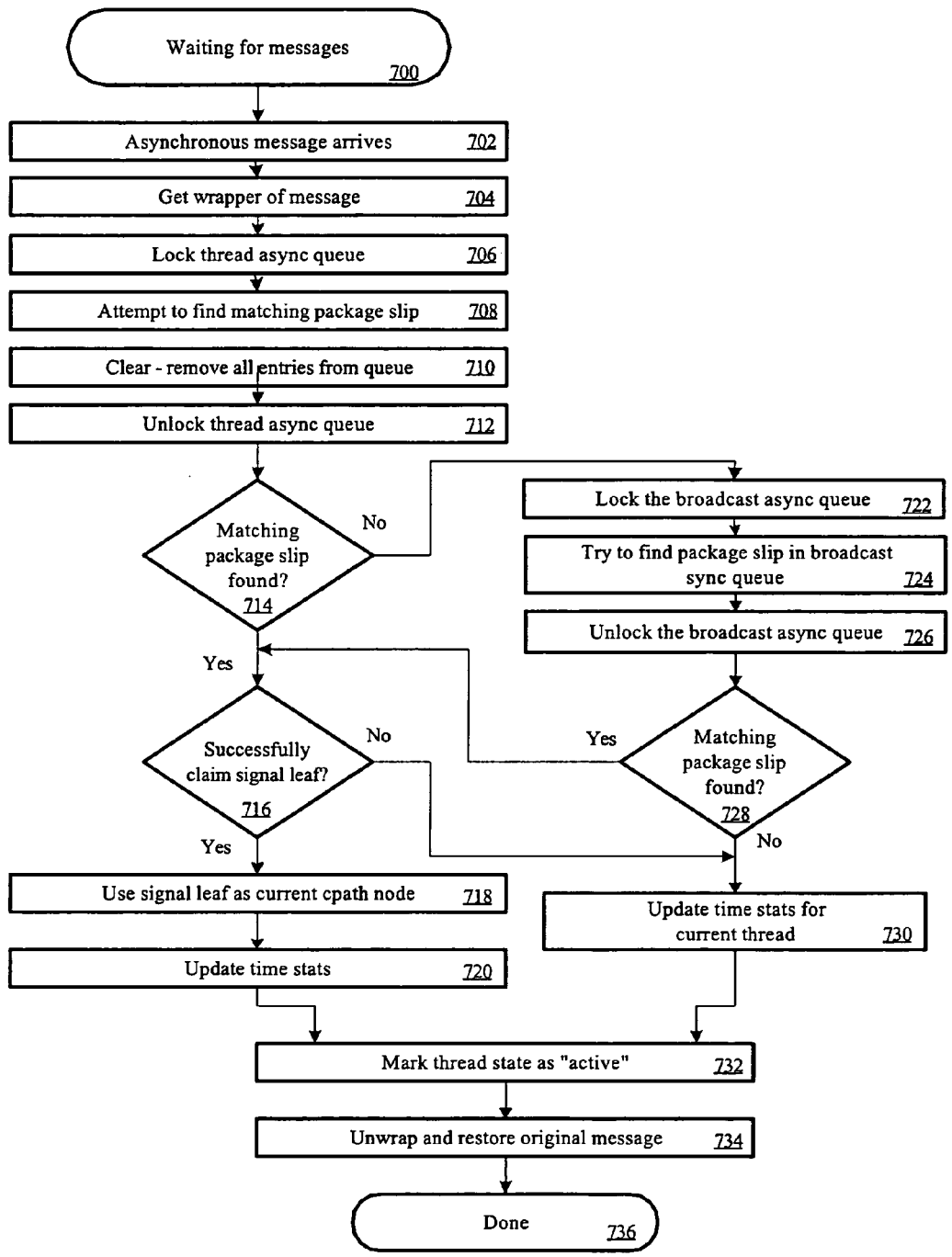
FIG. 7 is an illustration of an embodiment of operations for receipt of an asynchronous message.

FIG. 7 is an illustration of an embodiment of operations for receipt of an asynchronous message. In this illustration, there is initially a wait for messages for the thread 700 and a synchronous message arrives 702. With an asynchronous message there is generally a message wrapper and the wrapper is obtained 704. The asynchronous queue for the thread is locked 706 and there is an attempt to locate a matching package slip for the message in the queue 708. The queue is cleared of all entries because the entries will not be message signals to the thread 710, and the queue is unlocked 712.

In this illustration, there is a determination whether a matching package slip is found 718. If so, then there is a determination whether the signal leaf node from the package slip has been successfully claimed. If the signal leaf has been claimed, then the signal leaf in the package slip is deemed to be the current critical path node of the thread 718, the time statistics for the leaf are updated 720, and the thread state is marked as "active" 732. If the signal leaf is not successfully claimed, then the time statistics for the current thread are updated 730 and the thread status is marked as "active" 732. If a matching package slip is not found 714, then there is a check for a broadcast message. The broadcast asynchronous message queue (broadcast-async-r-queue) is locked 722, there is an attempt to locate the package slip 724, and the queue is unlocked 726. If the matching package slip is found 728, then the process continues with determining whether the signal leaf is successfully claimed 716. If the matching package slip is not found 728, then the process continues with updating the time statistics for the current thread 730. Following marking the thread state as active 732, the original message is unwrapped (if it was wrapped) and restored. The process is then completed 736, and typically the thread will then wake up and take some action regarding the received message.

Figure 8:
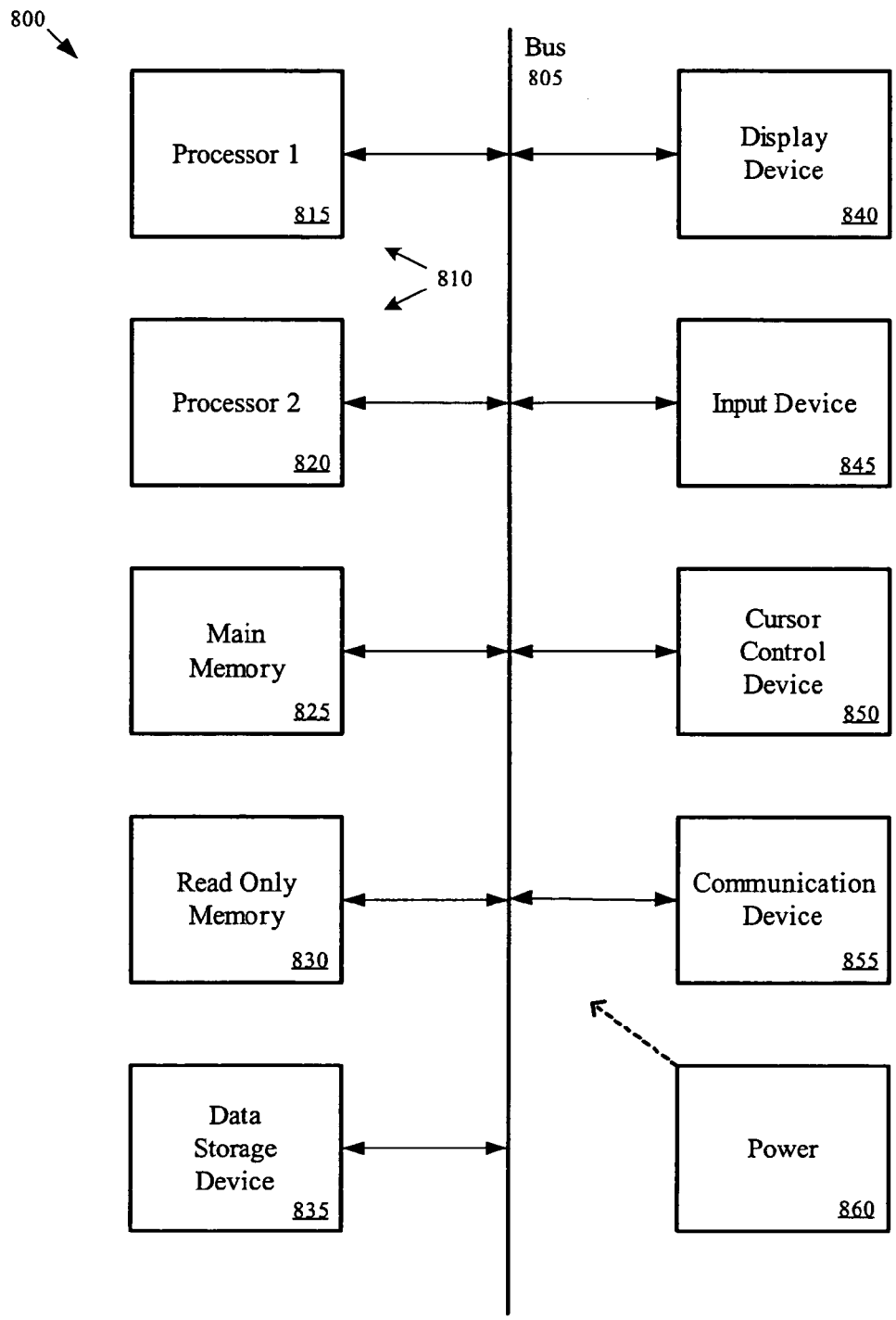
FIG. 8 is block diagram of an embodiment of a computer system.

FIG. 8 is block diagram of an embodiment of a computer system. Under an embodiment of the invention, a computer 800 comprises a bus 805 or other communication means for communicating information, and a processing means such as two or more processors 810 (shown as a first processor 815 and a second processor 820) coupled with the first bus 805 for processing information. The processors may comprise one or more physical processors and one or more logical processors.

The computer 800 further comprises a random access memory (RAM) or other dynamic storage device as a main memory 825 for storing information and instructions to be executed by the processors 810. Main memory 825 also may be used for storing temporary variables or other intermediate information during execution of instructions by the processors 810. The computer 800 also may comprise a read only memory (ROM) 830 and/or other static storage device for storing static information and instructions for the processors 810.

A data storage device 835 may also be coupled to the bus 805 of the computer 800 for storing information and instructions. The data storage device 835 may include a magnetic disk or optical disc and its corresponding drive, flash memory or other nonvolatile memory, or other memory device. Such elements may be combined together or may be separate components, and utilize parts of other elements of the computer 800.

The computer 800 may also be coupled via the bus 805 to a display device 840, such as a cathode ray tube (CRT) display, a liquid crystal display (LCD), or other display technology, for displaying information to an end user. In some environments, the display device may be a touch-screen that is also utilized as at least a part of an input device. In some environments, display device 840 may be or may include an auditory device, such as a speaker for providing auditory information. An input device 845 may be coupled to the bus 805 for communicating information and/or command selections to the processors 810. In various implementations, input device 845 may be a keyboard, a keypad, a touch-screen and stylus, a voice-activated system, or other input device, or combinations of such devices. Another type of user input device that may be included is a cursor control device 850, such as a mouse, a trackball, or cursor direction keys for communicating direction information and command selections to the one or more processors 810 and for controlling cursor movement on the display device 840.

A communication device 855 may also be coupled to the bus 805. Depending upon the particular implementation, the communication device 855 may include a transceiver, a wireless modem, a network interface card, or other interface device. The computer 800 may be linked to a network or to other devices using the communication device 855, which may include links to the Internet, a local area network, or another environment. The computer 800 may also comprise a power device or system 860, which may comprise a power supply, a battery, a solar cell, a fuel cell, or other system or device for providing or generating power. The power provided by the power device or system 860 may be distributed as required to elements of the computer 800.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:

creating a node for a first program thread in a critical path tree, the tree providing possible paths for a computer application stored in a computer memory and tracking messages between threads, the computer application being processed by one or more processors, the first program thread sending a message, the message to be sent to a second program thread of the computer application or to be broadcast;

creating a package slip for the message from the first program thread, the package slip containing information regarding the message, wherein the message is directed to a second program thread of the computer application or is directed to a broadcast of threads of the computer program;

placing the package slip on a first queue of a set of data structures for tracking of a critical path of the computer application, the set of data structures including a queue for receipt of synchronous messages, a queue for receipt of asynchronous messages, and a stack for processing of synchronous messages, the package slip being accessible to the second program thread on the first queue;

modifying the message to include a pointer to the package slip;

sending the message from the first program thread to the second program thread; and receiving the message at the second program thread, the second program thread to match the package slip from the first queue to the received message.

2. The method of claim 1, further comprising creating and transferring a pending node from the first program thread to the second program thread if the message requires an explicit reply message.

3. The method of claim 1, wherein the first queue is a thread queue associated with the second program thread if the message is sent to the second program thread.

4. The method of claim 1, wherein the first queue is a broadcast queue if the message is broadcast to a plurality of program threads.

5. The method of claim 1, wherein the message is a synchronous message and further comprising determining whether a leaf for a reply message for the synchronous message is found.

6. The method of claim 1, wherein the message is asynchronous and further comprising modifying the message prior to sending the message.

7. The method of claim 6, wherein modifying the message comprises wrapping the message.

8. The method of claim 1, further comprising determining whether the package slip from the first program thread that matches the message is present on a broadcast message queue.

9. The method of claim 1, further comprising obtaining a signal leaf from the package slip and using the leaf as a current critical path leaf.

10. The method of claim 1, wherein the received message is synchronous and further comprising pushing the package slip on the stack for processing of synchronous messages.

11. The method of claim 10, further comprising popping the package slip from the top of the stack.

12. The method of claim 1, wherein the received message is asynchronous and further comprising obtaining a wrapper for the message if the message includes a wrapper.

13. A computer-readable medium having stored thereon data representing sequences of instructions that, when executed by a processor, cause the processor to perform operations comprising:

creating a node for a first program thread in a critical path tree, the tree providing possible paths for a computer application stored in a computer memory and tracking messages between threads, the computer application being processed by one or more processors, the first program thread sending a message, the message to be sent to a second program thread of the computer application or to be broadcast;

creating a package slip for the message from the first program thread, the package slip containing information regarding the message, wherein the message is directed to a second program thread of the computer application or is directed to a broadcast of threads of the computer program;

placing the package slip on a first queue of a set of data structures for tracking of a critical path of the computer application, the set of data structures including a queue for receipt of synchronous messages, a queue for receipt of asynchronous messages, and a stack for processing of synchronous messages, the package slip being accessible to the second program thread on the first queue;

modifying the message to include a pointer to the package slip;

sending the message from the first program thread to the second program thread; and receiving the message at the second program thread, the second program thread to match the package slip from the first queue to the received message.

14. The medium of claim 13, wherein the first queue is a thread queue associated with the second program thread if the message is sent to the second program thread.

15. The medium of claim 13, wherein the first queue is a broadcast queue if the message is broadcast to a plurality of program threads.

16. The medium of claim 13, wherein the message is asynchronous and wherein the instructions further comprising instructions that, when executed by a processor, cause the processor to perform operations comprising wrapping the message with data regarding the message.

17. The medium of claim 13, wherein the instructions further comprising instructions that, when executed by a processor, cause the processor to perform operations comprising creating and transferring a pending node from the first program thread to the second program thread.

* * * * *